(12) United States Patent
Koehn et al.

(10) Patent No.: US 8,361,558 B2
(45) Date of Patent: Jan. 29, 2013

(54) PROCESS FOR THE PREPARATION OF A CLEAR COAT LAYER OF AN AUTOMOTIVE OEM MULTI-LAYER COATING

(75) Inventors: Fabian Koehn, Wuppertal (DE); Andreas Benfer, Sprockhoevel (DE); Birte Bannert, Wuppertal (DE)

(73) Assignee: E I Du Pont De Nemours and Company, Wilmington, DE (US)

( * ) Notice: Subject to any disclaimer, the term of this patent is extended or adjusted under 35 U.S.C. 154(b) by 0 days.

(21) Appl. No.: 12/708,691

(22) Filed: Feb. 19, 2010

(65) Prior Publication Data

US 2011/0171391 A1    Jul. 14, 2011

Related U.S. Application Data

(60) Provisional application No. 61/167,316, filed on Apr. 7, 2009.

(51) Int. Cl.
*B05D 1/02* (2006.01)

(52) U.S. Cl. .................. 427/421.1; 427/427.4

(58) Field of Classification Search ............... 427/421.1, 427/427.4
See application file for complete search history.

(56) References Cited

U.S. PATENT DOCUMENTS

| | | | |
|---|---|---|---|
| 4,832,991 A | 5/1989 | Hayward et al. | |
| 4,999,213 A | 3/1991 | Meyer | |
| 6,472,493 B1 | 10/2002 | Huynh-Ba | |
| 6,946,515 B1 * | 9/2005 | Lettmann et al. | 524/591 |
| 8,188,196 B2 | 5/2012 | Koehn et al. | |
| 2005/0131164 A1 | 6/2005 | Lenges | |
| 2006/0014024 A1 | 1/2006 | Itakura | |

FOREIGN PATENT DOCUMENTS

| | | |
|---|---|---|
| EP | 863170 A1 | 9/1998 |
| WO | 200055270 A1 | 9/2000 |

* cited by examiner

*Primary Examiner* — Timothy Meeks
*Assistant Examiner* — Nathan T Leong

(57) ABSTRACT

A coating process wherein a precoated automotive substrate is OEM clear coated with a two-component polyurethane clear coat composition prepared by static mixing a binder component having a solids content of 42 to 50 wt.-% comprising at least one hydroxyl-functional binder and a volatile organic content of 50 to 58 wt.-% and a polyisocyanate crosslinker component having a solids content comprising a free polyisocyanate solids content consisting of 75 to 100 wt.-% of at least one polyisocyanate of the 1,6-hexane diisocyanate isocyanurate type and of 0 to 25 wt.-% of at least one polyisocyanate of the isophorone diisocyanate isocyanurate type, wherein the sum of the respective wt.-% in each case totals 100 wt.-%.

9 Claims, No Drawings

PROCESS FOR THE PREPARATION OF A CLEAR COAT LAYER OF AN AUTOMOTIVE OEM MULTI-LAYER COATING

CROSS-REFERENCE TO RELATED APPLICATION

This application claims priority under 35 U.S.C. §119 from U.S. Provisional Application Ser. No. 61/167,316 filed Apr. 7, 2009 which is hereby incorporated by reference in its entirety.

FIELD OF THE PRESENT INVENTION

The present invention relates to a process for the preparation of a clear coat layer of an automotive OEM (original equipment manufacture) multi-layer coating making use of a two-component polyurethane clear coat composition.

BACKGROUND OF THE PRESENT INVENTION

Two-component polyurethane coating compositions are coating compositions that crosslink by formation of urethane bonds as a result of the addition reaction between the hydroxyl groups of a hydroxyl-functional binder component and the free isocyanate groups of a polyisocyanate crosslinker component. The hydroxyl-functional binder component and the polyisocyanate crosslinker component are stored separately from one another before being mixed to form the two-component polyurethane coating composition. Typically, two-component polyurethane coating compositions are prepared just prior to their application by mixing a hydroxyl-functional binder component with a polyisocyanate crosslinker component. Typical mixing equipment for two-component coatings present in automotive OEM coating plants are static mixers such as, in particular, Kenics mixers.

In automotive OEM coating plants the substrates to be spray coated are supplied in succession to the spray application apparatus, for example, by using an automatic conveying apparatus, for example, a conveyor belt. The spray application itself is effected while the individual substrate to be spray coated and/or the spray application apparatus are in motion.

The spray application process in automotive OEM coating plants is distinguished by breaks or interruptions which do not only occur between two individual substrates, i.e. not only in the time period after the spray coating of a substrate has been finished and before that of the following substrate is started, but even in the course of the spray coating of an individual substrate. Such breaks or interruptions may happen either unintentionally or deliberately and they may differ in duration. For example, they may take 0.5 seconds to 15 minutes. During such breaks or interruptions no coating material is sprayed and, after the break has ended, spray coating is taken up again at that position on the substrate surface where it had been interrupted when the break began.

Whereas such positions on a substrate surface as described in the preceding paragraph cannot be visually perceived while a clear coat layer applied from a two-component polyurethane clear coat is still wet or uncured, it may happen that such positions turn up as unwanted variations in optical appearance, after the clear coat has been bake cured. Examples of such variations in optical appearance are in particular visually perceptible mattings. Such optical surface defects mean a need for reworking or repainting and lead to productivity losses. In this respect there is a desire for a more robust automotive OEM two-component polyurethane clear coating process which minimizes or even eliminates the occurrence of said unwanted optical surface defects and the reworking or repainting effort associated therewith.

It has been found that said desire can be satisfied by providing an automotive OEM clear coating process carried out with a two-component polyurethane clear coat composition prepared in a certain manner from certain components.

SUMMARY OF THE PRESENT INVENTION

The present invention relates to a process for the preparation of an outer clear coat layer of an automotive OEM multi-layer coating comprising the steps:
(1) providing an automotive substrate to be OEM clear coated,
(2) providing a binder component having a solids content of 42 to 50 wt.-% (weight-%) comprising at least one hydroxyl-functional binder (binder with hydroxyl groups) and a volatile organic content of 50 to 58 wt.-% (hereinafter for brevity purposes also called "binder component"),
(3) providing a polyisocyanate crosslinker component,
(4) preparing a two-component polyurethane clear coat composition by static mixing the binder component provided in step (2) and the polyisocyanate crosslinker component provided in step (3),
(5) spray-applying the two-component polyurethane clear coat composition on the automotive substrate to be OEM clear coated and
(6) thermally curing the clear coat layer applied in step (5), wherein the polyisocyanate crosslinker component has a solids content of 66 to 70 wt.-% and a volatile organic content of 30 to 34 wt.-%, wherein the solids content of the polyisocyanate crosslinker component comprises a free polyisocyanate solids content consisting of 75 to 100 wt.-% of at least one polyisocyanate of the 1,6-hexane diisocyanate isocyanurate type and of 0 to 25 wt.-% of at least one polyisocyanate of the isophorone diisocyanate isocyanurate type, wherein the sum of the respective wt.-% in each case totals 100 wt.-%.

DETAILED DESCRIPTION OF THE EMBODIMENTS

In step (1) of the process of the present invention an automotive substrate to be OEM clear coated is provided.

In the description and the claims the term "automotive substrate to be OEM clear coated" is used. It refers to an automotive substrate that lacks a clear coat, or more precisely, an original clear coat as opposed to, for example, a repair clear coat.

Automotive substrates to be OEM clear coated include in particular precoated automotive bodies and precoated automotive body metal or plastic parts, the precoatings in each case lacking a final outer clear coat layer, as explained in the preceding paragraph. In each case the precoatings themselves comprise an outer pigmented coating layer which determines the color of the finished automotive substrate. Examples of automotive bodies include truck and vehicle bodies, for example, passenger car bodies and van bodies. Examples of automotive body metal or plastic parts include doors, bonnets, boot lids, hatchbacks, wings, spoilers, bumpers, collision protection strips, side trim, sills, mirror housings, door handles and hubcaps.

In the description and the claims the term "finished automotive substrate" is used. It refers to an automotive substrate provided with the automotive OEM multi-layer coating which is the result of the process of the present invention, i.e. the automotive OEM multi-layer coating including the thermally cured outer clear coat layer obtained on completion of step (6) of the process of the present invention.

Depending on the type of automotive substrate, the color-determining precoating may be a single- or multi-layer precoating which in any case still needs a final outer clear coat layer. The precoating or, in particular, the outer layer of the precoating may be already cured or still uncured. In the latter case it will be jointly thermally cured together with the clear coat spray-applied from the two-component polyurethane clear coat composition. In other words, the precoated automotive bodies are automotive bodies which have already been provided with a conventional automotive OEM multi-layer coating except for the final outer clear coat layer. In principle the same is true for the precoated automotive body metal or plastic parts; a possible difference is here that the precoating may comprise only one coating layer. It goes without saying that the precoatings are precoatings which are applied in the context of an automotive OEM coating process, i.e. generally in the context of an industrial automotive OEM mass production coating process.

The precoating on the automotive substrate comprises an outer pigmented coating layer which determines the color of the finished automotive substrate. In automotive coating such color-determining coating layers which require an outer clear coat layer are typically applied from solventborne or waterborne pigmented base coats. In case of automotive bodies or automotive body metal parts, examples of such precoatings lacking an outer clear coat layer include (i) a multi-layer coating comprising an electrocoat primer layer, a primer surfacer or primer surfacer substitute layer and an outer base coat layer, in particular, a multi-layer coating consisting of an electrocoat primer layer, a primer surfacer or primer surfacer substitute layer and an outer base coat layer, (ii) a multi-layer coating comprising an electrocoat primer layer and a two-layer base coat structure consisting of an inner modified base coat layer (modified base coat layer=base coat layer applied from a modified base coat which is a mixture of an unmodified base coat and an admixture component which imparts primer surfacer properties) and an outer unmodified base coat layer, in particular, a multi-layer coating consisting of an electrocoat primer layer and a two-layer base coat structure consisting of an inner modified base coat layer and an outer unmodified base coat layer and (iii) a multi-layer coating consisting of an electrocoat primer layer and an outer base coat layer. In case of automotive body plastic parts examples of precoatings lacking an outer clear coat layer include (i) a multi-layer coating comprising a plastics primer layer and an outer base coat layer, in particular, a multi-layer coating consisting of a plastics primer layer and an outer base coat layer and (ii) a single-layer coating in the form of a base coat layer.

In step (2) of the process of the present invention there is provided a binder component having a solids content of 42 to 50 wt.-% comprising at least one hydroxyl-functional binder and a volatile organic content of 50 to 58 wt.-%, wherein the sum of the wt.-% totals 100 wt.-%.

In the description and the claims the terms "binder solids" and "crosslinker solids" are used. They refer to the solids contribution of the coating binders (binder solids) and the solids contribution of the crosslinkers (crosslinker solids) contained in the two-component polyurethane clear coat composition. Binder solids and crosslinker solids together form the resin solids of the two-component polyurethane clear coat composition. The resin solids together with any further non-volatile constituents that may be present in the two-component polyurethane clear coat composition form the solids of the two-component polyurethane clear coat composition. Examples of such further non-volatile constituents include non-volatile additives and transparent fillers (transparent extender pigments). To avoid misunderstandings, the solids content of the two-component polyurethane clear coat composition shall not be confused with the solids content of the binder component or of the polyisocyanate crosslinker component.

In the description and the claims the term "volatile organic content" is used. It refers to the sum of all volatile organic constituents, i.e. the sum of organic solvents and, if present, volatile organic additives.

Apart from the volatile organic constituents and the at least one hydroxyl-functional binder, the binder component may also comprise one or more of the following optional constituents: one or more further binders other than (other than =different from) hydroxyl-functional binders, one or more further crosslinkers other than free polyisocyanate crosslinkers, non-volatile additives and transparent fillers. The solids content of the binder component has a hydroxyl number originating from the at least one hydroxyl-functional binder of, for example, 110 to 160 mg KOH/g.

Both, the binder component as well as the two-component polyurethane clear coat composition comprise one and the same binder solids. The binder solids comprise the at least one hydroxyl-functional binder and the optionally present further binders other than hydroxyl-functional binders. In a particular embodiment, the binder solids consist of one or more hydroxyl-functional binders.

Hydroxyl-functional binders and methods for their preparation are known to the person skilled in the art of paints and coatings. Examples include hydroxyl-functional resins like polyurethane resins, (meth)acrylic copolymer resins and polyester resins, but also polymer hybrid resins, wherein two or more of said resin types bound by covalent bonds or in the form of interpenetrating resin molecules are present. (Meth) acryl or (meth)acrylic is to be understood, both here and in the following, as acryl and/or methacryl or as acrylic and/or methacrylic. Hydroxyl-functional (meth)acrylic copolymer resins and polyester resins are preferred as hydroxyl-functional binders in the binder component provided in step (2) of the process of the present invention. The hydroxyl-functional binders are oligomeric or polymeric compounds with a number-average molar mass (Mn) in the range of, for example, 500 to 5000, preferably 1000 to 3000. Their hydroxyl numbers are in the range of, for example, 100 to 300 mg KOH/g.

All statements made in the present description and the claims in relation to number-average molar masses relate to number-average molar masses determined by GPC (gel permeation chromatography, polystyrene standards, polystyrene gel as stationary phase, tetrahydrofuran as mobile phase).

Examples of further binders other than hydroxyl-functional binders which may be contained in the binder component include binder resins without functional groups or with functional groups other than hydroxyl groups. Examples of resin types are the same as those mentioned above for the hydroxyl-functional binders. The further binders belong to the binder solids content of the binder component and they may form up to 10 wt.-% of the binder solids content. It is however preferred that the binder component contains no further binders other than hydroxyl-functional binders.

Examples of crosslinkers other than free polyisocyanate crosslinkers which may be contained in the binder component include reversibly blocked polyisocyanate crosslinkers and aminoplast resins, in particular, melamine resins. Such crosslinkers do not belong to the binder solids content of the binder component but together with the free polyisocyanates of the polyisocyanate crosslinker component they form the crosslinker solids of the two-component polyurethane clear coat composition. The crosslinkers other than free polyisocyanate crosslinkers may form up to 40 wt.-% of the crosslinker solids of the two-component polyurethane clear coat composition. In case the binder component contains no crosslinkers other than free polyisocyanate crosslinkers, the crosslinker solids of the two-component polyurethane clear coat composition consist of the at least one polyisocyanate of the 1,6-hexane diisocyanate isocyanurate type and the optionally present at least one polyisocyanate of the isophorone diisocyanate isocyanurate type.

The process of the present invention is of particular value, in case the binder component comprises melamine resin, in particular, in a proportion corresponding to 20 to 40 wt.-% of the crosslinker solids of the two-component polyurethane clear coat composition. The reason is that such two-component polyurethane clear coat compositions containing melamine resin and prepared by static mixing are especially susceptible to interruptions of or breaks during the spray-application and the disadvantages associated therewith regarding formation of optical surface defects, as explained in the section "Background of the Invention" above.

The binder component contains one or more organic solvents in a total amount of, for example, 48 to 58 wt.-%. Examples of organic solvents include monohydric or polyhydric alcohols, for example, propanol, butanol, hexanol; glycol ethers or esters, for example, diethylene glycol dialkylethers, dipropylene glycol dialkylethers, in each case with C1- to C6-alkyl, ethoxypropanol, butylglycol; glycols, for example, propylene glycol and oligomers thereof; glycol ether esters, for example, ethyl glycol acetate, butyl glycol acetate, 3-methoxy-n-butyl acetate, butyl diglycol acetate, methoxypropyl acetate; N-methylpyrrolidone and ketones, such as, methyl ethyl ketone, acetone, cyclohexanone; esters, such as, butyl acetate, isobutyl acetate, amyl acetate; aromatic or aliphatic hydrocarbons, for example, toluene, xylene or linear or branched, aliphatic C6- to C12-hydrocarbons.

Additives may be present in the binder component in a total amount of, for example, up to 5 wt.-%. Examples include paint additives such as leveling agents, wetting agents, dyes, light stabilizers, antioxidants, rheology control agents, anti-settling agents, antifoaming agents, adhesion-promoting substances, catalysts.

Examples of transparent fillers that may be contained in the binder component in an amount of, for example, up to 5 wt.-% include silica.

In step (3) of the process of the present invention there is provided a polyisocyanate crosslinker component having a solids content of 66 to 70 wt.-% and a volatile organic content of 30 to 34 wt.-%, wherein the sum of the wt.-% totals 100 wt.-%.

The solids content of the polyisocyanate crosslinker component comprises a free polyisocyanate solids content consisting of 75 to 100 wt.-% of at least one polyisocyanate of the 1,6-hexane diisocyanate isocyanurate type and of 0 to 25 wt.-% of at least one polyisocyanate of the isophorone diisocyanate isocyanurate type, wherein the sum of the wt.-% totals 100 wt.-%. Apart from the free polyisocyanate solids content the solids content of the polyisocyanate crosslinker component may further comprise one or more non-volatile additives as optional constituents. If the polyisocyanate crosslinker component contains no non-volatile additives, the solids content of the polyisocyanate crosslinker component consists of the free polyisocyanate solids content.

In the description and the claims the term "polyisocyanate of the 1,6-hexane diisocyanate isocyanurate type" is used. It means trimerization products of 1,6-hexane diisocyanate, for example, trimeric 1,6-hexane diisocyanate (1,6-hexane diisocyanate isocyanurate).

In the description and the claims the term "polyisocyanate of the isophorone diisocyanate isocyanurate type" is used. It means trimerization products of isophorone diisocyanate, for example, trimeric isophorone diisocyanate (isophorone diisocyanate isocyanurate).

The volatile organic content of the polyisocyanate crosslinker component consists of one or more organic solvents inert towards free isocyanate groups and, optionally, of up to 2 wt.-% of one or more volatile organic additives.

Examples of organic solvents which are inert towards free isocyanate groups include, for example, glycol ether esters, such as, ethyl glycol acetate, butyl glycol acetate, 3-methoxy-n-butyl acetate, butyl diglycol acetate, methoxypropyl acetate; ketones, such as, methyl ethyl ketone, cyclohexanone; esters, such as, butyl acetate, isobutyl acetate, amyl acetate; aromatic or aliphatic hydrocarbons, for example, toluene, xylene or linear or branched, aliphatic C6- to C12-hydrocarbons.

As already mentioned, the polyisocyanate crosslinker component may contain one or more additives in a total proportion of, for example, up to 5 wt.-%. Examples include paint additives such as leveling agents, wetting agents, dyes, light stabilizers, antioxidants, adhesion-promoting substances, catalysts.

The binder component and the polyisocyanate crosslinker component are stored separately from one another in order to prevent a premature cross-linking reaction until step (4) of the process of the present invention is carried out.

In step (4) of the process of the present invention a two-component polyurethane clear coat composition is prepared by static mixing the binder component provided in step (2) and the polyisocyanate crosslinker component provided in step (3).

Mixing is carried out in a specified ratio, for example, in a ratio corresponding to a 1:0.7 to 1:2 stoichiometry between the hydroxyl groups originating from the binder solids of the binder component and the free isocyanate groups originating from the polyisocyanate crosslinker component.

The two components are mixed together making use of a static mixer, for example, a conventional static mixer such as, in particular, a Kenics mixer. Kenics mixers are static mixers typically used for automotive OEM industrial production line coating and they have a length of, for example, 40 to 200 mm. The static mixing allows for a continuous mixing of the two components to be mixed shortly before the two-component polyurethane clear coat composition is spray-applied during step (5) of the process of the present invention. The two-component polyurethane clear coat composition so prepared leaves the static mixer and it is fed to the one or more spray-application devices.

The two-component polyurethane clear coat composition has a solids content in the range of, for example, 45 to 60 wt.-%. The volatile content of the two-component polyurethane clear coat composition is formed by (i) the organic solvent(s) originating from the binder component, (ii) the organic solvent(s) originating from the polyisocyanate crosslinker component and (iii) optionally present volatile organic additives.

In step (5) of the process of the present invention the two-component polyurethane clear coat composition is spray-applied on the automotive substrate to be OEM clear coated. In a particular embodiment, the spray-application process is performed with one or more interruptions of in each case, for example, 0.5 seconds to 15 minutes with taking the spray-application up again at that position on the automotive substrate surface where it had been interrupted before. Spray-application is carried out by conventional spray-application devices which are generally operated with electrostatic assistance. Examples of spray-application devices which are particularly suitable are high-speed rotary atomizers.

The two-component polyurethane clear coat composition is spray-applied in a dry film thickness in the range of, for example, 20 to 60 µm. Then, preferably after a brief flash-off phase of, for example, 30 seconds to 10 minutes at an air temperature of 20 to 25° C., the clear coat layer is thermally cured in step (6) of the process of the present invention. Thermal curing is preferably carried out by baking. Thermal curing takes, for example, 20 to 30 minutes and is carried out at object temperatures in the range of, for example, 80 to 160° C.

Generally, the process of the present invention is carried out in the context of an industrial automotive OEM mass production coating process, in particular, i.e. in an industrial automotive OEM painting facility.

EXAMPLES

Preparation of Clear Coat Layers

Example 1

1.1) Preparation of a binder component:
A binder component (clear coat base) was prepared from the following constituents:
21.5 wt.-% of a 65 wt.-% solution of a saturated polyester resin with a hydroxyl number of 285 mg KOH/g in methoxypropyl acetate,
12.0 wt.-% of a 70 wt.-% solution a saturated polyester resin with a hydroxyl number of 137 mg KOH/g in Solvesso™ 100,
24.0 wt.-% of Setal® 91715 SS-55 from Nuplex Resins (polyester resin containing sag control agent),
16.0 wt.-% of Setamine® US 146 BB-72 from Nuplex Resins (partly butylated melamine resin),
0.2 wt.-% of BYK® 310 from BYK Chemie (wetting additive),
0.9 wt.-% of Tinuvin® 292 from Ciba (HALS light stabilizer),
0.9 wt.-% of Tinuvin® 1130 from Ciba (UV absorber),
13.0 wt.-% Solvesso™ 150,
9.0 wt.-% butyl glycol acetate,
2.5 wt.-% n-butanol.
1.2) Preparation of a polyisocyanate crosslinker component:
68 pbw (parts by weight) of Desmodur® N 3300 from Bayer were dissolved in 32 pbw of an organic solvent mixture (80 pbw Solvesso™ 100 and 20 pbw butyl acetate).
1.3) Preparation and Application of a Two-Component Polyurethane Clear Coat Composition:
Using a Kenics mixer (length 150 mm), a two-component polyurethane clear coat composition was prepared from the binder component from Example 1.1) and the polyisocyanate crosslinker component from Example 1.2). Both components were dosed over the Kenics mixer in a mixing ratio of 3 pbw of binder component:1 pbw of polyisocyanate crosslinker component. The two-component polyurethane clear coat composition so prepared exiting the Kenics mixer was directly fed to a high-speed rotary atomizer and spray-applied in 45 µm dry film thickness onto a 30 cm×60 cm automotive body steel test panel provided with electrocoat primer, primer surfacer and black water-borne base coat (predried). Application was performed following a spray path with rectangle profile. After 5 minutes flashing off at room temperature the clear coat was bake cured for 20 minutes at 140° C. (object temperature).

1.4) Example 1.3) was repeated with the difference that the spray-application was interrupted for 20 seconds when the high-speed rotary atomizer reached the middle of the test panel's surface, i.e. after the 20 seconds interruption period the spray application was taken up again at that same position on the panel's surface.

Example 2

Example 1.4) was repeated with the difference that a mixing ratio of 2.5 pbw of binder component:1 pbw of polyisocyanate crosslinker component was used.

Example 3

Example 1.3) was repeated with the difference that a different polyisocyanate component prepared by dissolving 80 pbw of Desmodur® N 3300 in 20 pbw of an organic solvent mixture (80 pbw Solvesso™ 100 and 20 pbw butyl acetate) was used.

Example 4

Example 1.4) was repeated with the difference that a different polyisocyanate component prepared by dissolving 80 pbw of Desmodur® N 3300 in 20 pbw of an organic solvent mixture (80 pbw Solvesso™ 100 and 20 pbw butyl acetate) was used.

The multi-layer coatings obtained were tested for their visual impression. DOI (distinctness of image), long wave (LW), short wave (SW) and dullness (DU) were determined using the measuring device Wavescan DOI from BYK-Gardner. In case of examples 1.4), 2) and 4) the testing was made in a circle (10 cm in diameter) around the middle of the test panel where the clear coat application had been interrupted for 20 seconds. Table 1 shows the results that were obtained.

TABLE 1

| Clear coat example | Visual impression | DOI | LW | SW | DU |
|---|---|---|---|---|---|
| 1.3) | Ok | 94.3 | 0.9 | 0.5 | 4.0 |
| 1.4) | Ok | 94.1 | 1.2 | 6.4 | 4.2 |
| 2) | Ok | 93.8 | 1.4 | 5.7 | 4.9 |
| 3) | Ok | 93.1 | 1.6 | 6.0 | 4.5 |
| 4) | not ok | 87.5 | 3.0 | 20.3 | 14.9 | ok = homogeneous clear coat layer, glossy surface without defects,
not ok = glossy surface with a matting defect in the clear coat layer in the middle of the test panel.

What is claimed is:
1. A process for the preparation of an outer clear coat layer of an automotive OEM multi-layer coating comprising the steps:
(1) providing precoated automotive substrate to be OEM clear coated,
(2) providing a binder component having a solids content of 42 to 50 wt.-% comprising at least one hydroxyl-functional binder and a volatile organic content of 50 to 58 wt.-%, wherein the sum of the at least one hydroxyl-functional binder and the volatile organic content total to 100 wt.-%,

(3) providing a polyisocyanate crosslinker component,
(4) preparing a two-component polyurethane clear coat composition by static mixing the binder component provided in step (2) and the polyisocyanate crosslinker component provided in step (3),
(5) spray-applying the two-component polyurethane clear coat composition on the automotive substrate to be OEM clear coated and
(6) thermally curing the clear coat layer applied in step (5),
wherein the polyisocyanate crosslinker component has a solids content of 66 to 70 wt.-% and a volatile organic content of 30 to 34 wt.-%, the sum of the solids content and the volatile organic content totals 100 wt.-%, wherein the solids content of the polyisocyanate crosslinker component comprises a free polyisocyanate solids content consisting of 75 to 100 wt.-% of at least one polyisocyanate of the 1,6-hexane diisocyanate isocyanurate type and of 0 to 25 wt.-% of at least one polyisocyanate of the isophorone diisocyanate isocyanurate type,
wherein the sum of the wt.-% of the two polyisocyanates totals 100 wt.-%.

2. The process of claim 1, wherein the solids content of the binder component has a hydroxyl number originating from the at least one hydroxyl-functional binder of 110 to 160 mg KOH/g.

3. The process of claim 1, wherein the at least one hydroxyl-functional binder is selected from the group consisting of hydroxyl-functional (meth)acrylic copolymer resins and hydroxyl-functional polyester resins.

4. The process of claim 1, wherein the binder component comprises melamine resin.

5. The process of claim 4, wherein the melamine resin is comprised in a proportion corresponding to 20 to 40 wt.-% of the crosslinker solids of the two-component polyurethane clear coat composition.

6. The process of claim 1, wherein the mixing is carried out in a ratio corresponding to a 1:0.7 to 1:2 stoichiometry between the hydroxyl groups originating from the binder solids of the binder component and the free isocyanate groups originating from the polyisocyanate crosslinker component.

7. The process of claim 1, wherein the spray-application of step (5) is performed with one or more interruptions of in each case 0.5 seconds to 15 minutes with taking the spray-application up again at that position on the automotive substrate surface where it had been interrupted before.

8. The process of claim 1 carried out in an industrial automotive OEM mass production coating process.

9. A process for the preparation of an outer clear coat layer of an automotive OEM multi-layer coating comprising the steps:
(1) providing a precoated automotive substrate to be OEM clear coated,
(2) providing a binder component having a solids content of 42 to 50 wt.-% comprising at least one hydroxyl-functional binder and a volatile organic content of 50 to 58 wt.-%, wherein the sum of the at least one hydroxyl-functional binder and the volatile organic content total to 100 wt.-%,
(3) providing a polyisocyanate crosslinker component,
(4) preparing a two-component polyurethane clear coat composition by static mixing the binder component provided in step (2) and the polyisocyanate crosslinker component provided in step (3),
(5) spray-applying the two-component polyurethane clear coat composition on the automotive substrate to be OEM clear coated, wherein the spray-application is performed with one or more interruptions, each interruption in the range of from 0.5 seconds to 15 minutes, and when the spray application is resumed, it is continued at the position(s) on the automotive substrate where it had been interrupted, and
(6) thermally curing the clear coat layer applied in step (5),
wherein the polyisocyanate crosslinker component has a solids content of 66 to 70 wt.-% and a volatile organic content of 30 to 34 wt.-%, the sum of the solids content and the volatile organic content totals 100 wt.-% wherein the solids content of the polyisocyanate crosslinker component comprises a free polyisocyanate solids content consisting of 75 to 100 wt.-% of at least one polyisocyanate of the 1,6-hexane diisocyanate isocyanurate type and of 0 to 25 wt.-% of at least one polyisocyanate of the isophorone diisocyanate isocyanurate type,
wherein the sum of the wt.-% of the two polyisocyanates totals 100 wt.-%; and
wherein the resulting thermally cured clear coat layer of step (6) shows no visible defects at the position(s) of the automotive substrate where the spray application was interrupted.

* * * * *